United States Patent [19]

Wetzel et al.

[11] 4,368,560
[45] Jan. 18, 1983

[54] ARRANGEMENT FOR REMOVING SKIN OF SLAUGHTERED ANIMALS

[75] Inventors: Ludwig Wetzel, Pforzheim; Erich Mammel, Mühlacker, both of Fed. Rep. of Germany

[73] Assignee: Schmid & Wezel, Maulbronn, Fed. Rep. of Germany

[21] Appl. No.: 269,789

[22] Filed: Jun. 2, 1981

[30] Foreign Application Priority Data

Jun. 2, 1980 [DE] Fed. Rep. of Germany ....... 3020878

[51] Int. Cl.³ ............................................... A22B 5/16
[52] U.S. Cl. ........................................... 17/21; 30/219
[58] Field of Search ...................... 17/21; 30/208, 216, 30/217, 219

[56] References Cited

U.S. PATENT DOCUMENTS

2,974,413 3/1961 Williams ................................ 30/219
4,215,451 8/1980 Wikoff .................................... 17/21

Primary Examiner—Willie G. Abercrombie
Attorney, Agent, or Firm—Michael J. Striker

[57] ABSTRACT

An arrangement for removing skin of slaughtered animals has a housing substantially forming a handle, two cutting disks having a central plane corresponding to a central plane of the housing, a drive and transmission, a separating wall formed of one piece with the housing and separating the transmission from the cutting means as well as including a center plate extending substantially in the region of the central plane and a limiting plate extending substantially normal to the latter, a spacer ring abutting against the central plate and supporting the cutting disks, and two covers of which one cover is connected with the central plate and partially supports the eccentric shaft, and the other cover abuts against the limiting plate and is pressed against the spacer ring, wherein the central plate of the separating wall has a free end portion which is overlapped by end portions of the covers.

20 Claims, 2 Drawing Figures

Fig. 1

ARRANGEMENT FOR REMOVING SKIN OF SLAUGHTERED ANIMALS

BACKGROUND OF THE INVENTION

The present invention relates to an arrangement for removing skin of slaughtered animals.

Arrangements of the above mentioned general type are known in the art. A known arrangement has a head piece provided on a handle, two circular cutting disks having a plurality of cutting teeth engaging each other, two bevel gears engaging with one another and including one gear which is driven from a drive and the other gear arranged on an eccentric shaft extending normal to the handle central plane which coincides with the central plane of the cutting disks, wherein the eccentric shaft has two levers imparting reciprocating movement to the cutting disks, and finally a separating wall for sealing between the transmission and the cutting disks, and a cover partially supporting and axially securing the cutting disks are provided.

Such an arrangement is disclosed, for example, in the German Pat. No. 1,199,156. In this arrangement the separating wall is formed as a specially bent part extending forwardly beyond the front end of the housing shells. The handle is formed as a separate tubular member which is connected via an intermediate piece with one of the housing shells which is also a separate member. The arrangement in the region of the eccentric shaft is higher than in the region of the handle, and a roller bearing for the eccentric shaft is supported in one cover. The known arrangement is composed of a plurality of individual parts which make difficult the mounting. Because of the required adjustments, this leads to the fact that the arrangement is dismounted very seldom for cleaning and lubricating purposes. The separating wall does not allow material which is entrained between the cutting disks to proceed into the transmission and the bearings so that their service life is increased. However, the manufacture and assembling of the arrangement is complicated.

SUMMARY OF THE INVENTION

Accordingly, it is an object of the present invention to provide an arrangement for removing skin of slaughtered animals, which avoids the disadvantages of the prior art.

More particularly, it is an object of the present invention to provide an arrangement for removing skin of slaughtered animals, which is easy to manufacture, mounting and cleaning, and which can be formed slender and have a minimum angle between the cutting disks and the housing.

In keeping with these objects and with others which will become apparent hereinafter, one feature of the present invention resides in the fact that a separating wall which separates cutting disks from a transmission is formed one piece with the housing, bevel gears and an eccentric shaft of the transmission are partially supported in the housing and the latter substantially forms a handle, the separating wall has a central plate located substantially in the region of the central plane of the housing and a limiting plate extending normal to the latter, and two covers are provided of which one cover is connected with the central plate of the separating wall, for example by screws, and carries a bearing for the eccentric shaft, whereas the other cover abuts against the limiting plate of the separating wall and is pressed, for example by a screw, against a spacer ring which with its one side abuts against the central plate of the separating wall and with its periphery supports the cutting disk, and finally the free end of the central plate of the separating wall is overlapped by the ends of the covers.

When the arrangement is designed in accordance with the present invention, it is compact, possesses great stability, has a small number of individual parts, and can be easily assembled. The one-piece separating wall of the housing serves simultaneously as a mounting plate and is better enclosed inasmuch as it does not extend outwardly beyond the covers. The construction of the separating wall in connection with the arrangement of the eccentric shaft makes possible to design the arrangement so that its thickness normal to the cutting disks does not exceed, for example, 30 mm.

In accordance with another feature of the present invention, the central plate of the separating wall serves simultaneously as a gliding support for levers which are arranged on the eccentric shaft adjacent to one another and connected with the cutting disks.

In accordance with yet another feature of the present invention, the spacer ring is advantageously centered in a bush which is fixed to the central plate of the separating wall, and fixed by a pin arranged in the central plate. The bush can be screwed in the central plate, or advantageously cast integral therewith.

In accordance with a further feature of the present invention, the eccentric shaft has two pins, an eccentric, and a collar between the eccentric and one of the pins. One of the bevel gears is arranged on the latter pin for joint rotation therewith and provided with a projection which is supported in a housing by a bearing arranged between the projection and a recess in the housing. The other pin of the eccentric shaft has a ring which is supported in one cover by a roller bearing. The roller bearings are seated directly in the housing or in the cover, so that the height of the arrangement in the region of the eccentric shaft must not be increased as compared with the region of the handle.

The arrangement must have a small weight despite the fact that it must satisfy heavy requirements of the slaughtering field. For this purpose, the housing and the cover are composed of aluminum and the friction faces of the cutting disks on the covers or the central plate of the separating wall, or of the lever on the central plate of the separating wall are specially hardened, wherein this hardening is formed as so-called "Hard-Coating" produced for example by "GeTe-Hart Coat GmbH" in Germany.

The novel features which are considered characteristic for the present invention are set forth in particular in the appended claims. The invention itself, however, both as to its construction and its method of operation, together with additional objects and advantages thereof, will be best understood from the following description of preferred embodiments when read in connection with the accompanying drawing.

DESCRIPTION OF THE PREFERRED EMBODIMENT

Figure 2:
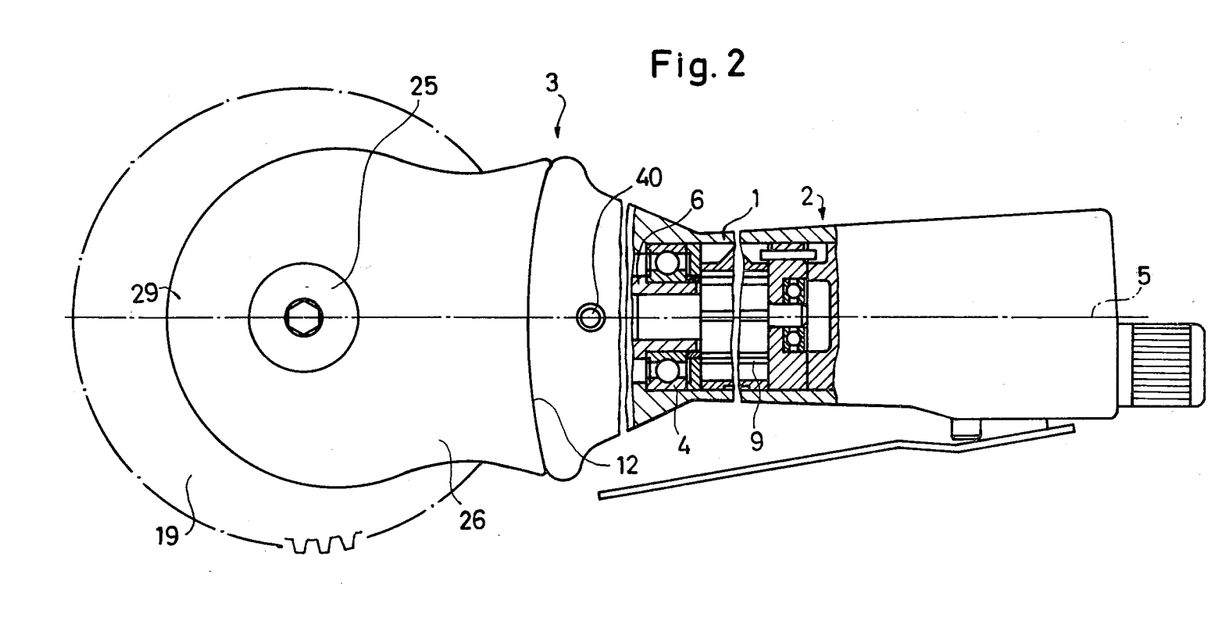
FIG. 2 is a view in direction of the arrow II in FIG. 1, partially sectioned.

An arrangement for removing skin of slaughtered animals in accordance with the present invention has a housing 1 which substantially forms a handle 2 and extends at its lower side forwardly so as to form a head part 3. A bearing 4 is arranged in the housing 1 and supports a bevel gear 6 extending substantially in a central plane 5. The bevel gear 6 engages with a bevel gear 7 which is arranged on an eccentric shaft 8 for joint rotation therewith. A pneumatic motor 9 is arranged in the central part of the handle 2 and has individual parts which can be seen at the right side in FIG. 2.

The head part 3 of the housing 1 has a separating wall which is identified in toto by reference numeral 10. The separating wall has a central plate extending in the region of the central plane 5, and a limiting plate 12 extending normal to the latter. A cover 13 is fixedly mounted on the central plate 11 with the aid of one or several screws 14, and a bush 15 is cast integral in the cover 13. The bush 15 centers a spacer ring 16 and is secured against rotation by a pin 17.

Two cutting disks 18 and 19 interposed over one another are supported on the periphery of the spacer ring 16. One of the cutting disks abuts against the central plate 11 or the front end 20 of the cover 13. The cutting disks 18 and 19 are provided at their periphery with not shown teeth whose flanks are arranged for providing cutting action. For this purpose, the cutting disks 18 and 19 are driven in a reciprocatory movement by two levers 21 and 22 of the eccentric shaft 8. The ratio can be so selected that with the utilization of a respective transmission 23 and the pneumatic motor 9, the number of strokes of the cutting disks 18 and 19 is equal to substantially 7,500 per minute, in condition of 6 bar with a damper.

Figure 1:
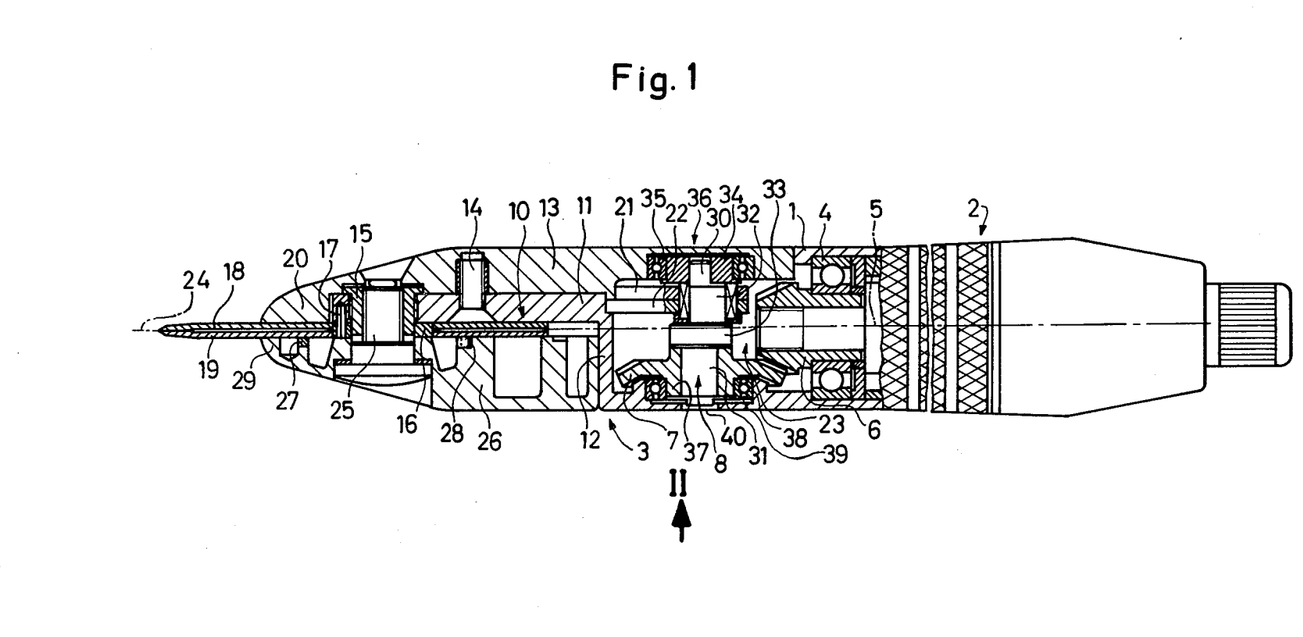
FIG. 1 is a view showing a longitudinal section of an arrangement for removing skin of slaughtered animals, in accordance with the present invention.

A central plane 24 of the cutting disks 18 and 19 coincides with the central plane 5 of the housing 1. The cutting disks 18 and 19 are axially secured by a screw 25 which is screwed in the bush 15. They are pulled against the spacer ring 16 by a further cover 26. The cover 26 has a groove 27 for receiving a corrugated spring 28 which presses the cutting disks 18 and 19 against one another, or one side of the cutting disk 18 against the central plate 11 or the front end 20 of the cover 30. As can be seen particularly in FIG. 1, the free end of the central plate 11 is retained inside the covers 13 and 26 at a sufficient distance from the front ends 20 and 29 of the covers.

The eccentric shaft 8 which extends normal to the cutting disks 18 and 19 is composed of two pins 30 and 31, an eccentric 32 and a collar 33 located between the eccentric 32 and the pin 31. The pin 30 is surrounded by a ring 34 provided with a ball bearing 35 for forming a support 36 in the cover 13. The levers 21 and 22 are seated on the eccentric 32 with interposition of a bearing. Their free ends carry not shown pins which extend through the central plate 11 and engage with the cutting disks 18 and 19. The bevel gear 7 is arranged on the pin 31 and provided with a projection 37, whereas a further roller bearing 39 is located between the projection 37 and a recess 38. An opening 40 is provided in the housing 1 in the region of the pin 31 for assembling and disassembling purposes.

During assembling, the cover 13 with mounted eccentric shaft 8 is inserted into the housing 1, and fixed connection is attained by the screws 14. Dirt particles cannot enter the interior of the transmission 23 from outside. For exchanging or cleaning the cutting disks 18 and 19, it suffices to release the screws 25, whereupon the removal of the cover 26 allows to withdraw and again insert the cutting disks 18 and 19 in convenient and reliable manner. The arrangement in the region of the eccentric shaft 8 is not thicker than in the region of the handle 2.

It will be understood that each of the elements described above, or two or more together, may also find a useful application in other types of constructions differing from the types described above.

While the invention has been illustrated and described as embodied in an arrangement for removing skin of slaughtered animals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for removing skin of slaughtered animals, comprising a housing having a central plane and substantially forming a handle; cutting means including two cutting disks having a further central plane substantially corresponding to said central plane of said housing; drive means; transmission means arranged between said drive means and said cutting means to reciprocate the latter, said transmission means including two bevel gears engaging with one another and an eccentric shaft at least partially supported in said housing; a separating wall arranged to separate said transmission means from said cutting means, said separating wall being of one piece with said housing and including a central plate extending substantially in the region of said central plane and a limiting plate extending substantially normal to the latter; a spacer ring having one side which abuts against said central plate, and a periphery on which said cutting disks are supported; and two covers one of which is connected with said central plate of said separating wall and partially supports said eccentric shaft, the other of said covers abutting against said limiting plate of said separating wall and being pressed against said spacer ring, said central plate of said separating wall having an end portion which is spaced from said limiting plate, and said covers overlapping said end portion of said central plate.

2. An arrangement for removing skin of slaughtered animals as defined in claim 1, wherein said cutting disks are circular and provided at their periphery with a plurality of cutting teeth pressed against each other.

3. An arrangement as defined in claim 1, wherein one of said bevel gears of said transmission means is supported on said eccentric shaft whereas the other of said bevel gears is driven from said drive means, said eccentric shaft extending substantially normal to said central plane and having two levers arranged to reciprocate said cutting disks.

4. An arrangement as defined in claim 1; and further comprising connecting means for connecting said one cover with said central plate of said separating wall, said connecting means including screws.

5. An arrangement as defined in claim 1; and further comprising means for partially supporting said eccentric shaft in said one cover, said supporting means including a bearing.

6. An arrangement as defined in claim 1; and further comprising means for pressing said other cover against said spacer ring, said pressing means including a screw.

7. An arrangement as defined in claim 1, wherein said eccentric shaft of said transmission means has two levers located adjacent to one another and connected with said cutting disks, said levers at least partially gliding over said central plate of said separating wall.

8. An arrangement as defined in claim 1; and further comprising means for fixing said spacer ring, said fixing means including a pin extending through said central plate of said separating wall.

9. An arrangement as defined in claim 6; and further comprising means for centering said spacer ring, said centering means including a bush which is fixed in said central plate of said separating wall, said screw which presses said other cover against said spacer ring being screwed into said bush.

10. An arrangement as defined in claim 9, wherein said bush of said centering means is cast integral in said central plate of said separating wall.

11. An arrangement as defined in claim 1, wherein said other cover has a groove; and further comprising means for pressing said cutting disks against one another and against said central plate of said separating wall, and including a corrugated spring arranged in said groove of said other cover.

12. An arrangement as defined in claim 1, wherein said eccentric shaft has two pins, an eccentric and a collar between said eccentric and one of said pins, one of said bevel gear of said transmission means being arranged on one of said pins and having a projection, said projection of said bevel gear being supported in said housing, whereas the other of said pins is supported in said one cover.

13. An arrangement as defined in claim 12; and further comprising means for supporting said projection of said one bevel gear in said housing and supporting said other pin in said one cover, said supporting means including a recess in said housing and a roller bearing arranged between said recess and said projection of said one bevel gear to support the latter, said supporting means further including a ring arranged on said other pin and provided with a bearing received in said one cover to support said other pin.

14. An arrangement as defined in claim 1, wherein one of said bevel gears is supported on said eccentric whereas the other of said gears is driven from said drive means, said housing having a head part and a handle part, said drive means including a motor supported in said handle part of said housing by a bearing, said handle part of said housing having a substantially circular cross section and a predetermined diameter.

15. An arrangement as defined in claim 14, said head part of said housing and said covers having dimensions, as considered in direction normal to said further central plane of said cutting disks, which do not exceed the diameter of said handle part of said housing.

16. An arrangement as defined in claim 1, wherein said housing and said covers are composed of aluminum and have hardened friction faces.

17. An arrangement as defined in claim 16, wherein said cutting disks have faces which cooperate with said covers and form said hardened friction faces.

18. An arrangement as defined in claim 16, wherein said cutting disks have faces which cooperate with said central plate of said separating wall and form said hardened friction faces.

19. An arrangement as defined in claim 1, wherein said eccentric shaft of said transmission means has two levers connected with said cutting disks and having a hardened friction face cooperating with said central plate of said separating wall.

20. An arrangement as defined in claim 16, wherein said friction faces are provided with hard coating.

* * * * *

REEXAMINATION CERTIFICATE (1497th)
United States Patent [19]
Wetzel et al.

[11] B1 4,368,560
[45] Certificate Issued Jul. 2, 1991

[54] ARRANGEMENT FOR REMOVING SKIN OF SLAUGHTERED ANIMALS

[75] Inventors: Ludwig Wetzel, Pforzheim; Erich Mammel, Mühlacker, both of Fed. Rep. of Germany

[73] Assignee: Schmid & Wezel, Maulbrönn, Fed. Rep. of Germany

Reexamination Request:
No. 90/001,971, Mar. 23, 1990

Reexamination Certificate for:
Patent No.: 4,368,560
Issued: Jan. 18, 1983
Appl. No.: 269,789
Filed: Jun. 2, 1981

[30] Foreign Application Priority Data

Jun. 2, 1980 [DE] Fed. Rep. of Germany ....... 3020878

[51] Int. Cl.⁵ .............................................. A22B 5/16
[52] U.S. Cl. ...................................... 452/133; 30/219
[58] Field of Search ...................... 452/133, 132, 125; 30/219, 208, 216, 217

[56] References Cited
U.S. PATENT DOCUMENTS 3,435,522  4/1969  Wezel ................................... 30/219

FOREIGN PATENT DOCUMENTS

1199156  5/1966  Fed. Rep. of Germany .
1268512  5/1968  Fed. Rep. of Germany .

*Primary Examiner*—Willis Little

[57] ABSTRACT

An arrangement for removing skin of slaughtered animals has a housing substantially forming a handle, two cutting disks having a central plane corresponding to a central plane of the housing, a drive and transmission, a separating wall formed of one piece with the housing and separating the transmission from the cutting means as well as including a center plate extending substantially in the region of the central plane and a limiting plate extending substantially normal to the latter, a spacer ring abutting against the central plate and supporting the cutting disks, and two covers of which one cover is connected with the central plate and partially supports the eccentric shaft, and the other cover abuts against the limiting plate and is pressed against the spacer ring, wherein the central plate of the separating wall has a free end portion which is overlapped by end portions of the covers.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-20, dependent on an amended claim, are determined to be patentable.

1. An arrangement for removing skin of slaughtered animals, comprising a housing having a central plane and substantially forming a handle; cutting means including two cutting disks having a further central plane substantially corresponding to said central plane of said housing; drive means; transmission means arranged between said drive means and said cutting means to reciprocate the latter, said transmission means including two bevel gears engaging with one another and an eccentric shaft at least partially supported in said *arrangement* housing; a separating wall arranged to separate said transmission means from said cutting means, said separating wall being of one piece with said *arrangement* housing and including a central plate extending substantially in the region of said central plane and a limiting plate extending substantially normal to the latter; a spacer ring having one side which abuts against said central plate, and a periphery on which said cutting disks are supported; and two covers one of which is connected with said central plate of said separating wall and partially supports said eccentric shaft, the other of said covers abutting against said limiting plate of said separating wall and being pressed against said spacer ring, said central plate of said separating wall having an end portion which is spaced from said limiting plate[, and said covers overlapping said end portion of said central plate]; *each of said covers having a front end, and said end portion of said central plate being retained inside said covers at a distance spaced from said front ends of said covers.*

* * * * *

REEXAMINATION CERTIFICATE (2635th)
United States Patent [19]
Wetzel et al.

[11] B2 4,368,560
[45] Certificate Issued    Jul. 25, 1995

[54] ARRANGEMENT FOR REMOVING SKIN OF SLAUGHTERED ANIMALS

[75] Inventors: Ludwig Wetzel, Pforzheim; Erich Mammel, Mühlacker, both of Germany

[73] Assignee: Schmid & Wezel, Maulbronn, Germany

Reexamination Request:
No. 90/003,273, Dec. 15, 1993

Reexamination Certificate for:
Patent No.: 4,368,560
Issued: Jan. 18, 1983
Appl. No.: 269,789
Filed: Jun. 2, 1981

[30] Foreign Application Priority Data

Jun. 2, 1980 [DE] Germany ............................. 3020878

[51] Int. Cl.$^6$ ............................................. A22B 5/16
[52] U.S. Cl. ......................................... 452/133; 30/219
[58] Field of Search ................... 452/133, 132, 125; 30/219, 208, 216, 217

[56] References Cited

U.S. PATENT DOCUMENTS

| | | | |
|---|---|---|---|
| 3,435,522 | 4/1969 | Wezel et al. | 30/219 |
| 3,570,124 | 3/1971 | Wezel | 30/208 |
| 3,857,177 | 12/1974 | Karubian et al. | 30/216 |

FOREIGN PATENT DOCUMENTS

| | | |
|---|---|---|
| 1023780 | 3/1953 | France . |
| 2011615 | 3/1970 | France . |
| 674322 | 4/1939 | Germany . |

OTHER PUBLICATIONS

Translation of German Patent 674 322.
Translation of French publication No. 1,023,780.

*Primary Examiner*—Willis Little

[57] ABSTRACT

An arrangement for removing skin of slaughtered animals has a housing substantially forming a handle, two cutting disks having a central plane corresponding to a central plane of the housing, a drive and transmission, a separating wall formed of one piece with the housing and separating the transmission from the cutting means as well as including a center plate extending substantially in the region of the central plane and a limiting plate extending substantially normal to the latter, a spacer ring abutting against the central plate and supporting the cutting disks, and two covers of which one cover is connected with the central plate and partially supports the eccentric shaft, and the other cover abuts against the limiting plate and is pressed against the spacer ring, wherein the central plate of the separating wall has a free end portion which is overlapped by end portions of the covers.

REEXAMINATION CERTIFICATE ISSUED UNDER 35 U.S.C. 307

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claims 1–20 are cancelled.

* * * * *